(12) United States Patent
Steiner et al.

(10) Patent No.: US 7,789,179 B2
(45) Date of Patent: Sep. 7, 2010

(54) METHOD OF COMPRESSION MOLDING MOTOR VEHICLE COMPONENTS AND PARTS MADE THEREFROM

(75) Inventors: Jerry L. Steiner, Decatur, IN (US); Floyd A. Etzler, Convoy, OH (US); Peter J. Voors, Fort Wayne, IN (US); Jerry J. Connett, Fort Wayne, IN (US); Steven A. Oliver, Decatur, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 790 days.

(21) Appl. No.: 11/743,693

(22) Filed: May 3, 2007

(65) Prior Publication Data

US 2008/0272518 A1 Nov. 6, 2008

(51) Int. Cl.
B62D 25/10 (2006.01)
(52) U.S. Cl. .................. 180/69.2; 296/193.11
(58) Field of Classification Search .............. 180/69.2, 180/69.23, 69.24; 296/193.11, 35.1
See application file for complete search history.

(56) References Cited

U.S. PATENT DOCUMENTS

| | | | | |
|---|---|---|---|---|
| 1,534,903 | A * | 4/1925 | Bouchard | 165/134.1 |
| 4,583,933 | A | 4/1986 | Woelfel et al. | |
| 4,721,070 | A * | 1/1988 | Tanaka et al. | 123/2 |
| 4,971,172 | A * | 11/1990 | Hoffman et al. | 180/68.3 |
| 5,054,567 | A * | 10/1991 | Hoffman | 180/68.2 |
| 6,058,903 | A * | 5/2000 | Downham | 123/198 E |
| 6,558,596 | B1 | 5/2003 | Bienick et al. | |
| 6,729,008 | B2 * | 5/2004 | Nishijima | 29/458 |
| 6,846,038 | B1 * | 1/2005 | White et al. | 296/193.11 |
| 6,848,524 | B2 * | 2/2005 | Vaillancourt et al. | 180/68.1 |
| 6,918,171 | B2 * | 7/2005 | Kucera et al. | 29/525 |
| 6,923,495 | B2 * | 8/2005 | Kishikawa et al. | 296/193.09 |
| 7,240,753 | B2 * | 7/2007 | Ellerman | 180/69.2 |
| 7,416,038 | B2 * | 8/2008 | Etzler et al. | 180/69.2 |
| 7,607,723 | B2 * | 10/2009 | Bierjon et al. | 296/203.02 |
| 7,673,716 | B2 * | 3/2010 | Moen et al. | 180/69.2 |
| 2002/0195839 | A1 * | 12/2002 | Nishijima | 296/194 |
| 2005/0001452 | A1 * | 1/2005 | White et al. | 296/193.11 |
| 2006/0175104 | A1 * | 8/2006 | Etzler et al. | 180/69.2 |
| 2006/0197347 | A1 * | 9/2006 | Hoffman et al. | 293/102 |
| 2007/0289790 | A1 * | 12/2007 | Moen et al. | 180/69.2 |
| 2008/0048471 | A1 * | 2/2008 | Seksaria et al. | 296/193.11 |
| 2008/0211242 | A1 * | 9/2008 | Schmidt et al. | 293/155 |

* cited by examiner

*Primary Examiner*—Jeffrey J Restifo
*Assistant Examiner*—Jacob Meyer
(74) *Attorney, Agent, or Firm*—Jeffrey P. Calfa; Mark C. Bach

(57) ABSTRACT

The invention is a method to make compression molded motor vehicle parts from a charge of composite material with resin and fibers, such as sheet molded compound. The parts have voids, such as holes and gaps, that form in the compression mold under heat and pressure and not in secondary processing steps. The resin in the charge is melts in a reservoir in the mold to form resinous material from the charge. A flow front of resinous material is allowed to flow into a flow path around a restriction corresponding to the shape of the void from the reservoir. The flow front carries sufficient reinforcing fibers into the flow path. At least part of a border for the void forms in the flow path. The configuration is allowed to at least partially set.

5 Claims, 7 Drawing Sheets

METHOD OF COMPRESSION MOLDING MOTOR VEHICLE COMPONENTS AND PARTS MADE THEREFROM

BACKGROUND OF THE INVENTION

1. Field of the Invention

The present invention relates to a method of making molded motor vehicle parts having a void in the configuration of the part. The void forms during the compression molding of the part and not in a secondary processing step.

2. Description of the Prior Art

Motor vehicle parts and other parts made with composite material, such as fiber reinforced plastic for example fiberglass parts made from sheet molding compound (SMC), require that most parts are molded as a solid configuration, especially for parts that support heavy objects. It was thought that allowing melted resin to flow around a restriction in a mold to form a void would also form knit lines of insufficient reinforcing fibers. Such knit lines would weaken the part and prevent it from being used, especially for supporting heavy objects like a truck's hood that can weigh hundreds of pounds.

In this disclosure, the term "void" is used to refer to a structural discontinuity in the configuration of the part. Voids can include openings, apertures, holes, slots, gaps, space between projections, and the like. Voids can be completely surrounded by the molded configuration such as a hole or located at the edge of the configuration such as a slot or a gap. Voids can be regularly or irregularly shaped and can be bordered by narrow structures such as fingers or projections.

To avoid the knit lines and the subsequent weakening of the part, voids in the plastic parts made with prior art methods, such as openings, gaps, irregularly shaped borders and structures, and the like, are generally formed from a solid molded configuration in secondary processes, such as water jet cutting, sawing, routing, and the like, either manually, automated, or robotic. As shown in FIG. 1, a charge of composite material is put into a mold 80 and the mold is closed. Heat and pressure are applied to the closed mold and the configuration forms and sets 82. After removing the configuration from the mold, the molded configuration's transfer to another workstation 86, machine, or cell to perform the secondary process after first forming in the mold 82. At the new workstation, the desired void is cut out of the molded configuration using a machine like a water jet 88 and the waste material removed. The molded configuration is then removed from the secondary process 90 and transferred to another workstation 94. These further secondary processes require additional tooling to make the voids, adding to the manufacturing costs.

Because these secondary processes remove unwanted material, the unwanted material must be appropriately disposed. The waste material typically cannot be easily and cheaply recycled. The disposal of unwanted material increases the cost of making the part.

Cutting the molded configuration to form voids also generates a large amount of dust. This dust must also be removed and disposed as well as prevented from polluting the air. If water is used during the cutting, such as during waterjet cutting, the waste water must be collected and cleaned with the waste material separated from the water. This requires expensive water treatment.

Because most of these parts are made from thermosetting resins, if there are any defects introduced during the secondary processing operation, such as a part cut outside of the part's tolerances, the part cannot be used. The part must be disposed of and the time and materials wasted.

The more the parts are handled and processed, the more problems can occur. These problems can include increased human error, a chance of damaging the part during transit to the next work station, and the like.

Therefore, it would be advantageous to reduce the amount of polymer used in the mold to make the part. It would also be advantageous to reduce the amount of waste produced in making the part. It would be further advantageous to reduce the number of steps and manpower used to make the part.

SUMMARY OF THE INVENTION

According to the invention there is provided a method to make a motor vehicle part from a composite material comprising a resin and fibers in a compression mold under pressure and heating. The part has one or more voids formed within the mold during pressure and heating.

In the method, a charge of the composite material in placed into one of the mold portions, such as in a reservoir. The mold portions close to form the mold. The mold itself has a restriction, which can be in one of the mold portions or formed by closing the mold portions. A flow path is located around the restriction and is in fluid communication with the reservoir.

Heat and pressure are applied to the closed mold to melt the charge of resin to form resinous material. A flow front of resinous material forms, such as at the edge of the reservoir. The flow front can then flow from the reservoir into the flow path around the restriction. Sufficient reinforcing fibers flow into the flow path from the reservoir. A border defines at least part of a void in the configuration. At least part of the border forms from the resinous material in the flow path. The configuration of the part within the closed mold is allowed to at least partially set and can be cured before use.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
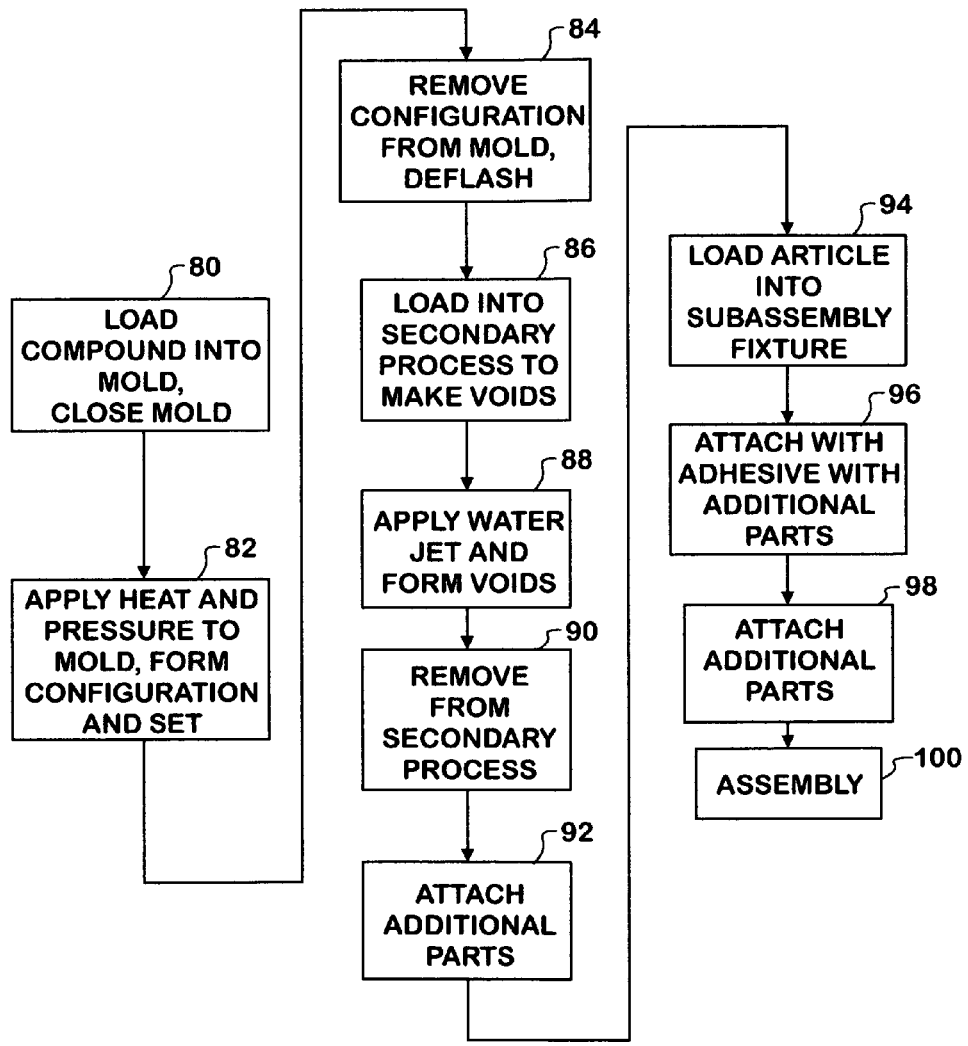
FIG. 1 is a flow chart showing some of the steps used in a prior art method of making a part.

With reference to the Figures where like reference numerals refer to like structures, motor vehicle parts for the vehicle's body, such as reinforcement structures and the like, often have at least one void in their configuration. The parts can be used for medium to heavy duty trucks and school buses.

The parts are made of plastic with reinforcing fibers, such as fiberglass. The plastic forms from a charge of composite material comprising a resin and fibers. The resin is usually a thermoset, such as polyester or epoxy resin, although a thermoplastic resin could be used. The fibers are glass or carbon, although metal fibers could be used. The composite material is preferably sheet molding compound (SMC), which is usually a thermoset resin and glass fibers. Fibers can be short chopped, long fibers or a mixture. The composite material can also have inorganic fillers, a release agent, a catalyst, curing agents, and the like, all of which are well known in the art.

Figure 2:
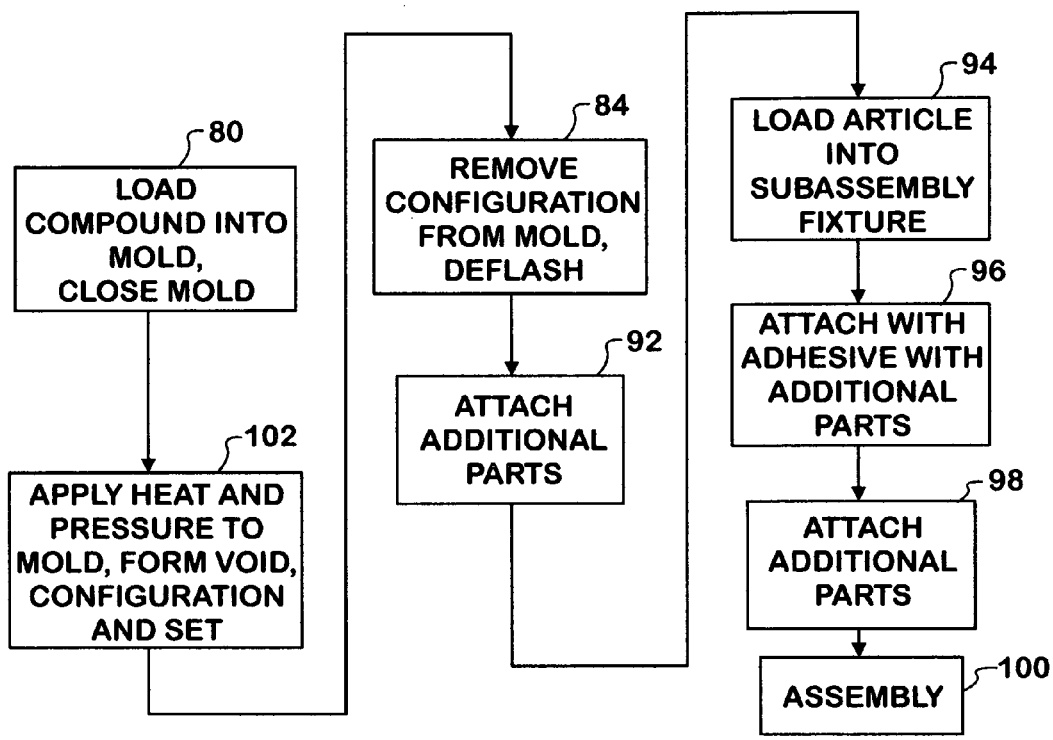
FIG. 2 is a flow chart showing some of the steps used in making a part following the method of the invention.
Figure 3:
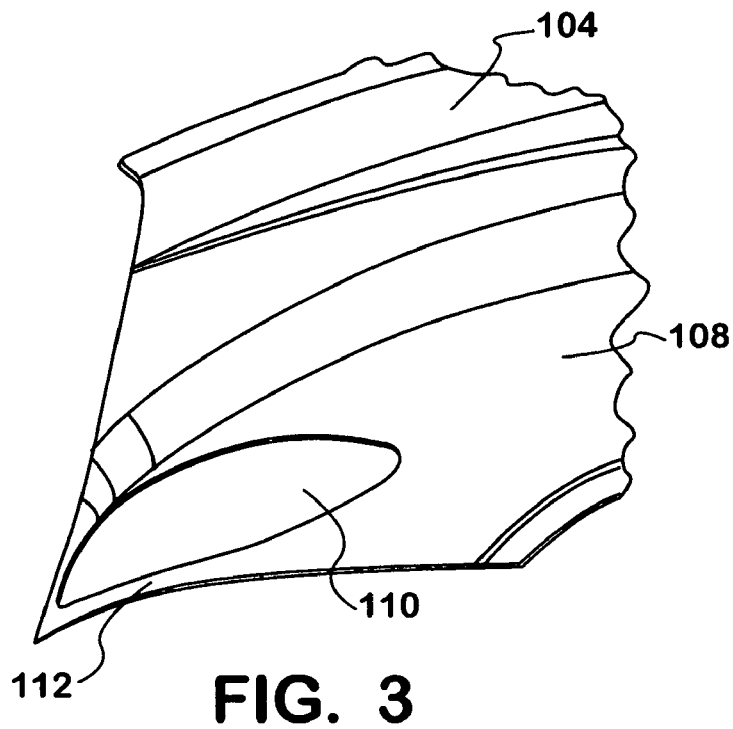
FIG. 3 is a schematic representation of part of a mold portion with a restriction, and a flow path around at least part of the restriction.
Figure 4:
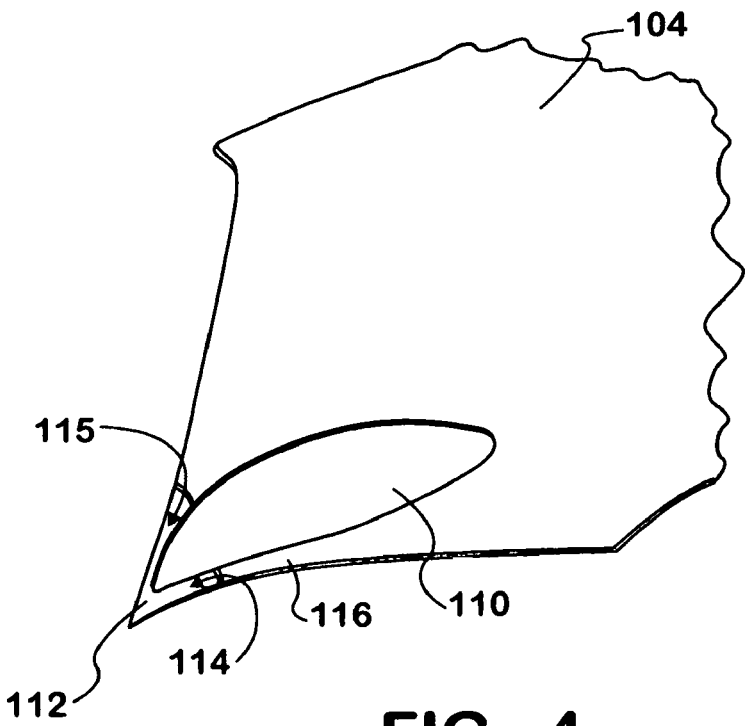
FIG. 4 is a schematic representation showing the flow front of the resinous material in part of a mold portion with a restriction, and a flow path around at least part of the restriction.

Turning to FIGS. 2-4, a molded configuration of the part is made in a compression mold having complementary first and second mold portions 104. The mold is designed to produce the voids in the configuration of the part during the molding process. At least one of the mold portions has a reservoir 108 for receiving a charge of the composite material. Multiple reservoirs of varying sizes and dimensions can be used in the mold.

When closed, the mold has at least one restriction 110 to prevent the melted resinous material from flowing into that portion of the mold. The restriction 110 can be in either mold portions 104 or form by the closing of the mold. The restriction 110 has a shape that corresponds to the shape of at least part of a void in the configuration of the part. A flow path 112 is in fluid communication with the reservoir 108 and borders at least part of the restriction 110. The flow path 112 has a shape that corresponds to a border 116 defining at least part of the void and can define all of the void. Multiple flow paths can be used around a single restriction. Additional restrictions, additional flow paths and additional reservoirs can be used in one mold to form different structures and any additional voids in one part. At least part of the flow path is preferably kept free from the charge of composite material before melting.

Once the charge of the composite material is placed in one of the mold portions 104, such as into the reservoir 108, the other mold portion is closed onto the first mold portion to form the mold. The first portion can be heated before closing, if desired.

After closing, heat and pressure are applied to the closed mold to melt the resin. The pressure can be supplied by one of mold portions compressing the other mold portion and the charge. The pressure applied to the mold can range from about 200 psi to about 1500 psi. The temperature applied to the mold can range from about 250 EF to about 325 EF.

The configuration and the void form within the closed mold 102. Once the resin melts, a flow front 114 of resinous material forms an edge of the charge. The flow front 114 is allowed to flow into the flow path 112 from the reservoir 108 and around the restriction 110. Typically the pressure in the mold forces the resinous material into the flow path 112. At least part of the border 116 of the void forms in the flow path 112.

A second flow front 115 is allowed to flow into the flow path 112 from the reservoir 108 and around the restriction 110 from a second direction.

The closed mold may contain additional restrictions corresponding to additional voids in the configuration for the motor vehicle part. These additional restrictions can have additional flow paths around them. Additional flow fronts of resinous material flow into the additional flow paths around the additional restrictions.

The configuration at least partially sets within the closed mold. For thermosetting resins, the part is also cured, although curing could be finished outside of the mold after partially setting.

The molded configuration is removed from the mold and can be deflashed 84. After deflashing, extra objects can be attached 92. Next, the configuration is typically loaded into a subassembly fixture 94. Other vehicle parts can be attached, such as with adhesive 96 or fastening 98 before assembly 100.

Figure 5:
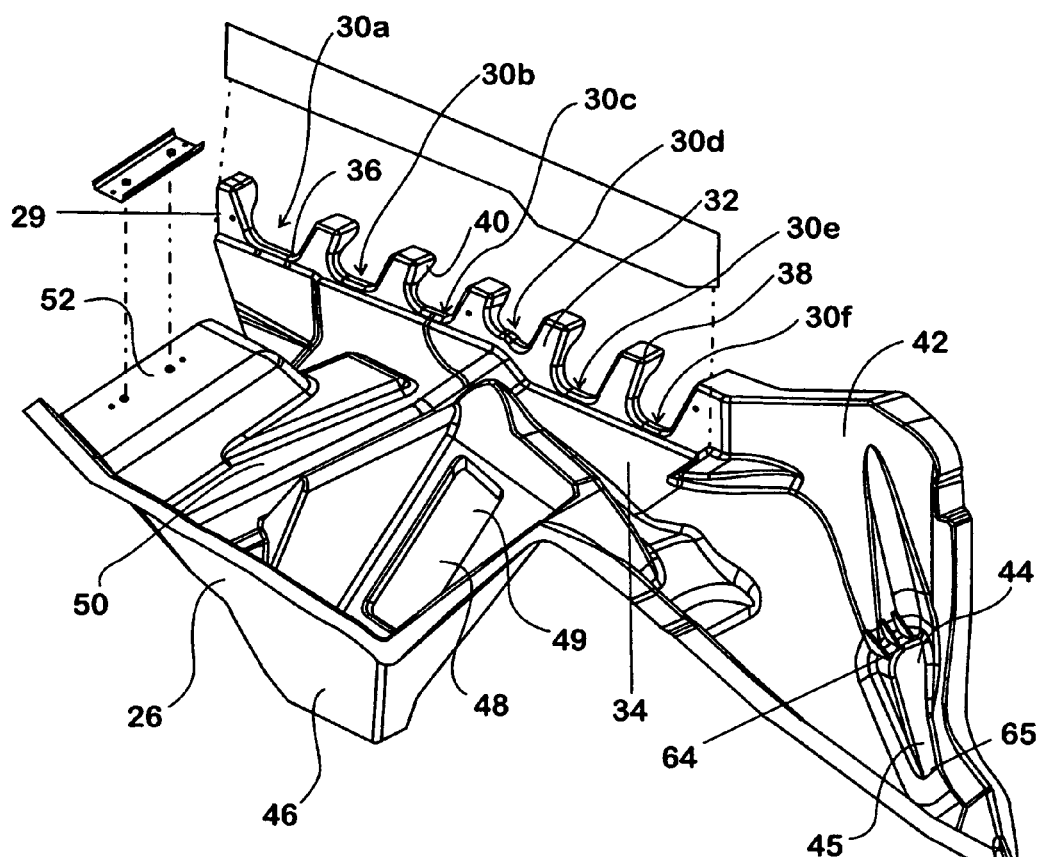
FIG. 5 is front perspective view of a left rear reinforcement made from the method of the invention.
Figure 7:
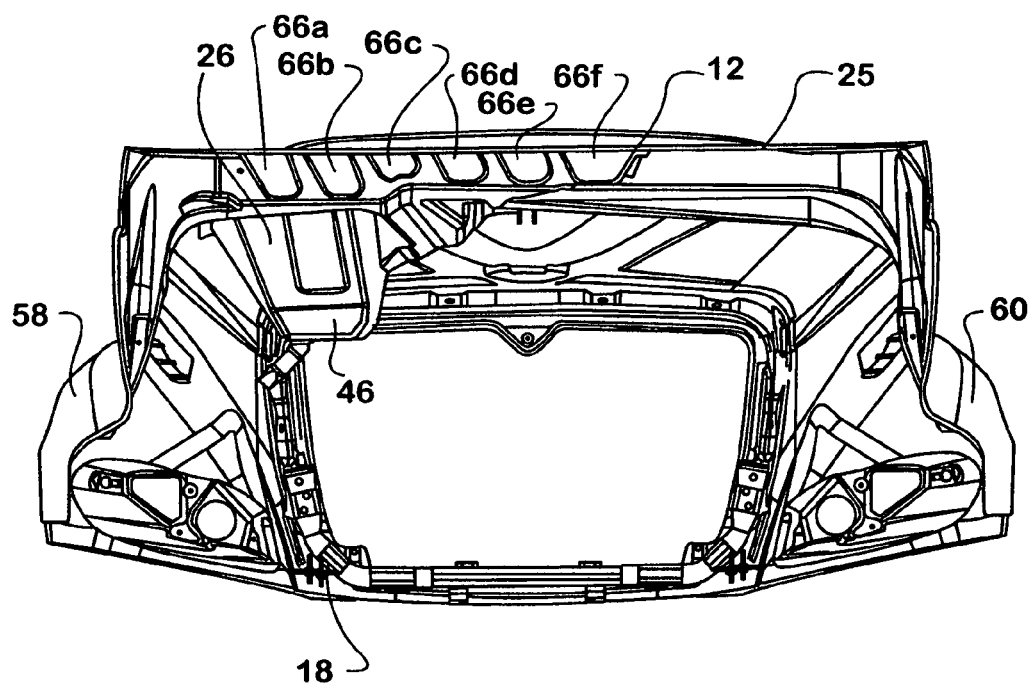
FIG. 7 is a rear view of an embodiment of an assembled hood assembly with the left and right rear reinforcements.

The method of the invention allows some parts to form a void that is a portion of an opening used in the assembled frame or vehicle. The completed opening forms by combining one part, such as a left rear reinforcement 26 as shown in FIG. 5 with another component part, such as the top 25 of the hood 12 as shown in FIG. 7. The two component parts are simply bonded together to form the complete openings 66a, 66b, 66c, 66d, 66e, 66f.

The method of the invention eliminates the costly steps of molding a configuration of the part without the void, then using a secondary operation to make the void by cutting the configuration and removing the cut piece. The method also eliminates other costs associated with the secondary operations, such as labor, racking and unracking of the part, moving the part to another work station, loading and unloading the part into additional machines, tooling and programming and maintenance of the additional machines, waste disposal, water purification, dust collection, waste disposal of the waste material, and the like.

It has long been thought that forming voids in a fiber reinforced plastic part could not be done by compression molding. It was thought that during heating and under pressure in the mold, the resinous material flowing around a restriction to form a void would create a weak point of insufficient reinforcing fibers. These weak points would be found where the resinous material of two flow fronts meet at the contact point or when one flow front flows into a narrow or constricted flow path in the mold, such as that corresponding to fingers in a motor part. Insufficient reinforcing fibers would bridge the contact point where the flow fronts meet, a phenomenon called knit lines. Because insufficient reinforcing fibers would be located at the knit line, the part would fail at the contact point or knit line when supporting heavily weighted objects, such as the hood of a heavy duty truck.

Surprisingly, parts with voids made under pressure and heat in a compression mold do not form weak points and do not fail when used to support heavy items, for example hoods for motor vehicles. The parts have sufficient reinforcing fibers located at the contact points or in the constricted flow path of the mold to prevent a weak point in the part. These parts, the left rear reinforcement 26 shown in FIG. 5 for example, have a complex three-dimensional design and can be used in assemblies to support other heavy parts, like motor vehicle hoods which weigh hundreds of pounds. The left rear reinforcement 26 has a number of voids 36, 44, 48, 56 in its body 39, many of which are irregularly shaped and made in constricted flow paths.

The left reinforcement 26 shown if FIG. 5 has fingers 32 as part of the border 29 and extend at an edge of a base 34 with voids 36 or gaps 30a, 30b, 30c, 30d, 30e, 30f located between the fingers 32. The fingers 32 form part of the vehicle's air vents after further assembly. Each finger 32 can have a rear facing head 40 at the tip 38. Gaps 30a, 30b, 30c, 30d, 30e, 30f are irregularly shaped. The fingers 32 are narrow and can form in the flow path of the mold during manufacturing of the left reinforcement assembly.

The base 34 has an ear 42 with a void 44, such as aperture 45. The aperture 45 is wider at a first end 64 than a second end 65. A trough 46 projects outwardly from the base 34 toward the hood reinforcement assembly 20. The trough 46 has a void 48, such as opening 49. A support 50 extends outwardly from the base 34 adjacent to the trough 46. A platform 52 extends upwardly from the support 50.

Figure 6:
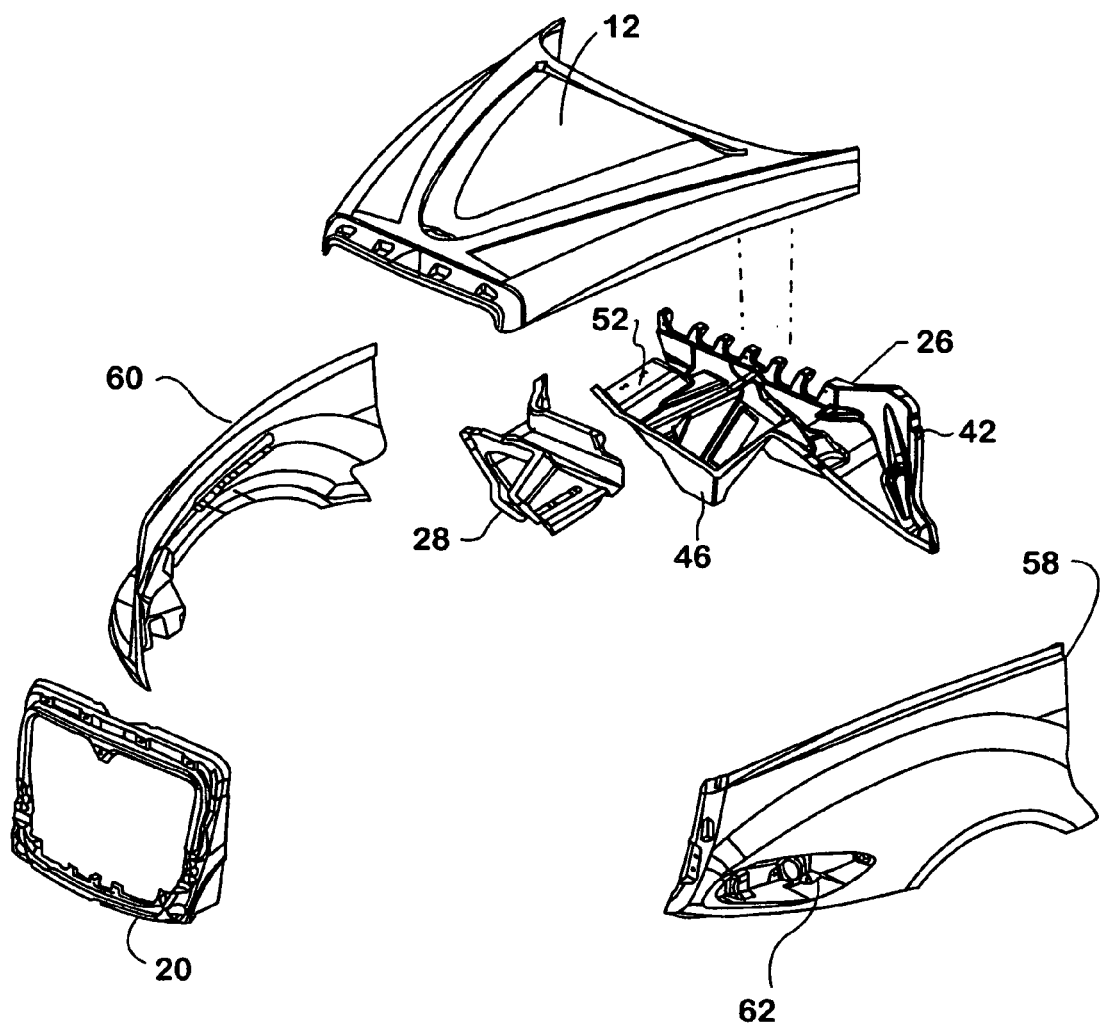
FIG. 6 is an exploded view of a left rear reinforcement made from the method of the invention, right rear reinforcement assembly which can be made from the method of the invention, the front hood reinforcement assembly, right and left fenders which can be made from the method of the invention and the top of the hood.
Figure 8:
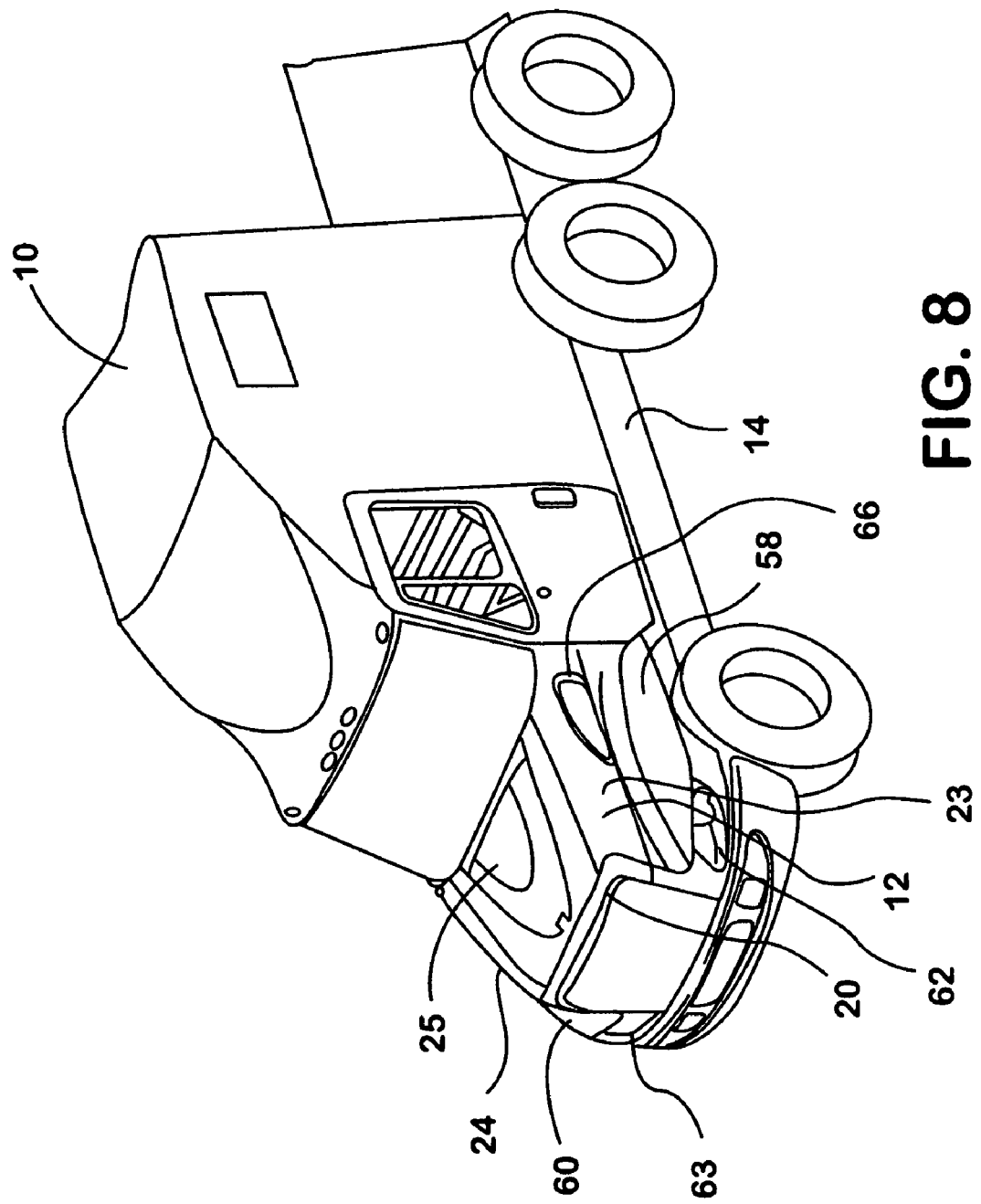
FIG. 8 is a perspective view of a motor vehicle with an installed left rear reinforcement made from the method of the invention and a side scoop in the side of the hood that can be made with the method of the invention.

The left rear reinforcement 26 is used in a motor vehicle 10, such as a truck or school bus. The motor vehicle 10 has a hood 12 pivotally mounted to the vehicle frame 14 using a hinge assembly 18 for pivoting between respective closed and open positions. (FIGS. 6-8) The hood 12 has left 23 and right 24 sides and a top 25. A left rear reinforcement 26 fastens to the hood 12 and a right rear reinforcement 28 fastens to the left rear reinforcement 26. The right rear reinforcement 28 can fasten at the platform 52. A front reinforcement assembly 20 fastens to the hood 12 and to the hinge assembly 18. The hinge assembly 18 also fastens to the vehicle frame 14. Left and right fenders 58, 60 also attach to the front reinforcement assembly 20.

Other parts for the motor vehicle which can be made following the method of the invention include the fenders and the sides of the hood. The left and right fenders 58, 60, for example, each have an void 62, 63 which provides an opening for receiving a headlight. The left and right sides 23, 24 of the hood also have an void 66 which provides a side air intake opening.

The method of the invention has a number of advantages. The method of the invention reduces the amount of composite material used in the mold to make the part. Because the voids are formed in the mold and not during secondary processing steps, the amount of waste produced, including waste water, dust and unneeded plastic, is reduced. The method also reduces the number of steps and labor used to make the part. The part produced by the method of the invention can be used to support heavily weighted objects, such as the hood of a motor vehicle.

While the invention is shown in only one of its forms, it is not thus limited but is susceptible to various changes and modifications without departing from the spirit and scope of the invention.

What is claimed is:

1. A rear hood reinforcement for a motor vehicle made from resin, and fibers, comprising:
   a base having an edge, and an ear having an aperture;
   fingers extending from the edge of the base;
   gaps being located between the fingers;
   a trough projecting outwardly from the base;
   an opening in the trough;
   a support extending outwardly from the base adjacent to the trough; and
   a platform projecting upwardly from the support.

2. A rear hood reinforcement for a motor vehicle made from resin, and fibers, of claim 1, wherein each finger further comprises:
   a tip; and
   a rear facing head at the tip.

3. A hood assembly for a motor vehicle, comprising:
   a front hood reinforcement assembly;
   a left rear hood reinforcement made from resin, and fibers and having a base having an edge, and an ear with an aperture, fingers extending from the edge, gaps being located between the fingers, a trough projecting outwardly from the base toward the front hood reinforcement assembly, an opening in the trough, a support extending outwardly from the base adjacent to the trough, and a platform extending upwardly from the support;
   a right rear hood reinforcement attaching to the left rear hood reinforcement;
   a top attaching to the front hood reinforcement assembly and the right and left rear hood reinforcements;
   a right side attaching to the front hood reinforcement assembly; and
   a left side attaching to the left rear hood reinforcement and the front hood reinforcement assembly.

4. A hood assembly for a motor vehicle, of claim 3, wherein each finger further comprises:
   a tip; and
   a rear facing head at the tip.

5. A hood assembly for a motor vehicle, of claim 4, further comprising:
   a vehicle frame pivotally mounted to the front hood reinforcement assembly.

* * * * *